United States Patent
Wraback et al.

(10) Patent No.: US 12,341,823 B2
(45) Date of Patent: Jun. 24, 2025

(54) SYSTEM FOR DETERMINING AND MONITORING COMPLIANCE WITHIN A COMPUTING ENVIRONMENT

(71) Applicant: Senteon Inc., Matawan, NJ (US)

(72) Inventors: Nicole Wraback, Manalapan, NJ (US); Henry Zhang, Hackensack, NJ (US)

(*) Notice: Subject to any disclaimer, the term of this patent is extended or adjusted under 35 U.S.C. 154(b) by 174 days.

(21) Appl. No.: 18/050,800

(22) Filed: Oct. 28, 2022

(65) Prior Publication Data
US 2023/0135587 A1    May 4, 2023

Related U.S. Application Data

(60) Provisional application No. 63/263,249, filed on Oct. 29, 2021.

(51) Int. Cl.
*H04L 9/40* (2022.01)

(52) U.S. Cl.
CPC .......... *H04L 63/20* (2013.01); *H04L 63/1433* (2013.01)

(58) Field of Classification Search
CPC ............................. H04L 63/20; H04L 63/1433
USPC ............................................................. 726/1
See application file for complete search history.

(56) References Cited

U.S. PATENT DOCUMENTS

| | | | |
|---|---|---|---|
| 10,462,171 B2* | 10/2019 | Weingarten | G06F 8/61 |
| 10,659,325 B2* | 5/2020 | Dam | H04L 43/045 |
| 11,604,880 B2* | 3/2023 | Robison | H04L 9/0891 |
| 11,658,984 B2* | 5/2023 | Gujarathi | H04L 9/3213 713/176 |
| 11,736,526 B2* | 8/2023 | Jeong | H04L 63/1458 726/1 |
| 11,824,862 B1* | 11/2023 | Singh | H04L 63/101 |
| 2016/0359866 A1* | 12/2016 | Mixer | H04L 67/12 |
| 2017/0199752 A1* | 7/2017 | Cao | G06F 11/3409 |
| 2017/0366421 A1* | 12/2017 | Dam | H04L 43/50 |
| 2019/0052659 A1* | 2/2019 | Weingarten | H04L 67/10 |
| 2019/0132361 A1* | 5/2019 | Hernandez | H04L 47/20 |
| 2022/0343157 A1* | 10/2022 | Mankowitz | G06N 3/008 |
| 2023/0007030 A1* | 1/2023 | Weingarten | H04L 41/0894 |
| 2023/0061123 A1* | 3/2023 | Low | H04L 9/30 |
| 2023/0119545 A1* | 4/2023 | Kelly | H04L 45/70 709/238 |
| 2023/0135587 A1* | 5/2023 | Wraback | H04L 63/20 726/1 |
| 2023/0344899 A1* | 10/2023 | Zhu | H04L 67/1008 |
| 2024/0288584 A1* | 8/2024 | Uyeno | G01S 7/4817 |

* cited by examiner

*Primary Examiner* — Taghi T Arani
*Assistant Examiner* — Pegah Barzegar

(57) ABSTRACT

A system is disclosed that includes a computer. The computer includes a processor and a memory. The memory includes instructions such that the processor is programmed to: group a plurality of endpoints based on evaluation result data for each endpoint of the plurality of endpoints; determine a target system configuration for the group; and transmit the target system configuration to a software agent corresponding to each endpoint of the plurality of endpoints.

12 Claims, 5 Drawing Sheets

SYSTEM FOR DETERMINING AND MONITORING COMPLIANCE WITHIN A COMPUTING ENVIRONMENT

BACKGROUND

Computing devices typically include multiple system settings that can be modified by one or more actors. For example, actors may be able to customize and configure an operating system of the computing device by altering the systems settings. In some instances, system settings can be altered for malicious purposes.

SUMMARY

A system is disclosed that includes a computer. The computer includes a processor and a memory. The memory includes instructions such that the processor is programmed to: group a plurality of endpoints based on evaluation result data for each endpoint of the plurality of endpoints; determine a target system configuration for the group; and transmit the target system configuration to a software agent corresponding to each endpoint of the plurality of endpoints.

In other features, the processor is further programmed to determine the target system configuration based on a base system configuration and a blocking condition status.

In other features, the processor is further programmed to receive the blocking condition status from at least one software agent.

In other features, the at least one software agent performs an application programming interface (API) call to determine the blocking condition status.

In other features, the processor is further programmed to determine an optimal system configuration for at least one endpoint, where the optimal system configuration comprises a recommend system configuration but for at least one blocked setting.

In other features, the processor is further programmed to set the target system configuration to the optimal system configuration.

In other features, the at least one blocked setting within the optimal system configuration is set to a next most secure unblocked value.

A system is disclosed that includes a server device and a plurality of endpoints communicatively connected to the server device. The server device includes a computer. The computer includes a processor and a memory. The memory includes instructions such that the processor is programmed to: group the plurality of endpoints based on evaluation result data for each endpoint of the plurality of endpoints; determine a target system configuration for the group; and transmit the target system configuration to a software agent corresponding to each endpoint of the plurality of endpoints.

In other features, the processor is further programmed to determine the target system configuration based on a base system configuration and a blocking condition status.

In other features, the processor is further programmed to receive the blocking condition status from at least one software agent.

In other features, the at least one software agent performs an application programming interface (API) call to determine the blocking condition status.

In other features, the processor is further programmed to determine an optimal system configuration for at least one endpoint, where the optimal system configuration comprises a recommend system configuration but for at least one blocked setting.

In other features, the processor is further programmed to set the target system configuration to the optimal system configuration.

In other features, the at least one blocked setting within the optimal system configuration is set to a next most secure unblocked value.

A method is disclosed that includes grouping a plurality of endpoints based on evaluation result data for each endpoint of the plurality of endpoints; determining a target system configuration for the group; and transmitting the target system configuration to a software agent corresponding to each endpoint of the plurality of endpoints.

In other features, the method includes determining the target system configuration based on a base system configuration and a blocking condition status.

In other features, the method includes receiving the blocking condition status from at least one software agent.

In other features, the at least one software agent performs an application programming interface (API) call to determine the blocking condition status.

In other features, the method includes determining an optimal system configuration for at least one endpoint, wherein the optimal system configuration comprises a recommend system configuration but for at least one blocked setting.

In other features, the method includes setting the target system configuration to the optimal system configuration, wherein the at least one blocked setting within the optimal system configuration is set to a next most secure unblocked value.

DETAILED DESCRIPTION

Figure 1:
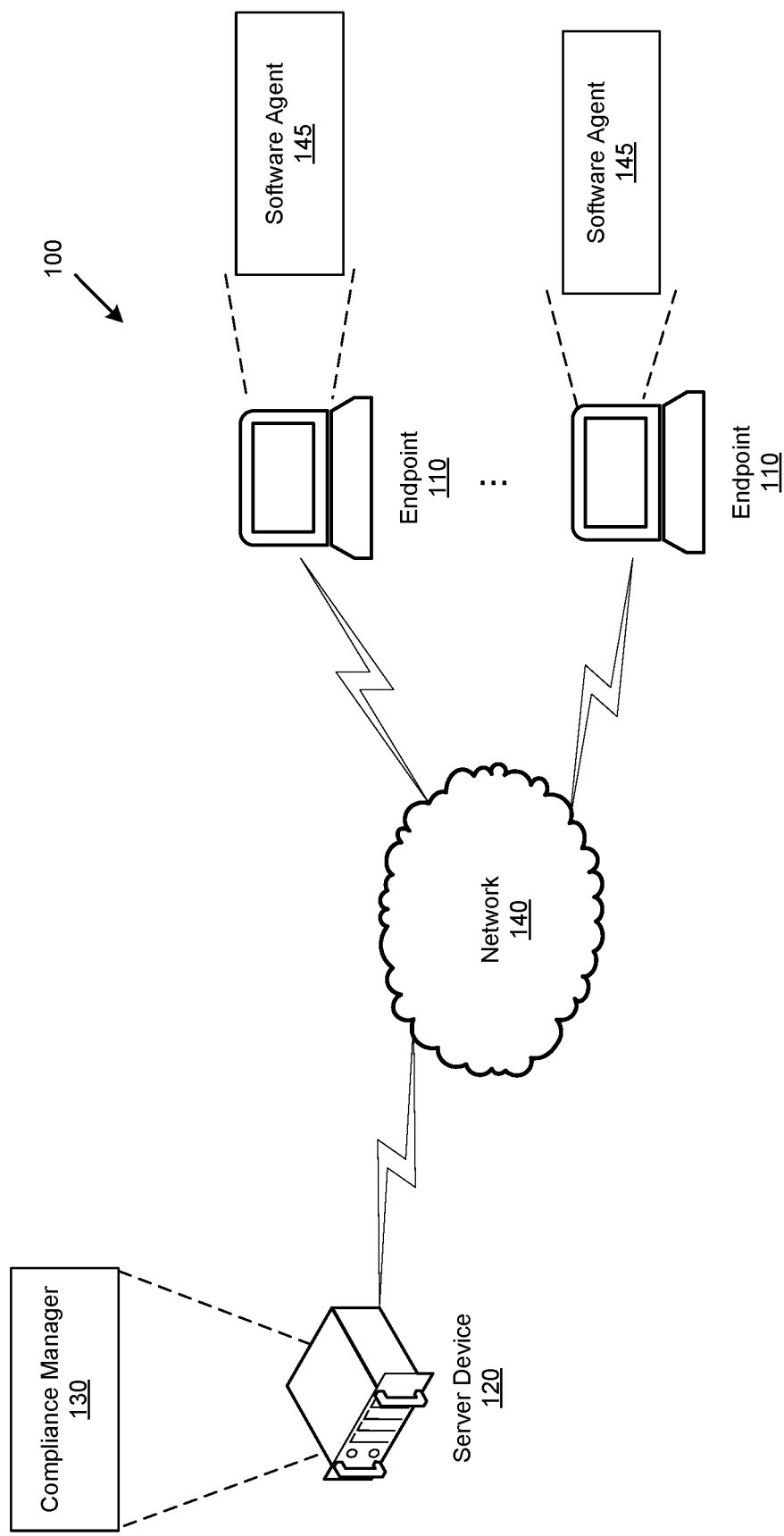
FIG. 1 is a diagram of an example system for determining and monitoring compliance within a computing environment.

FIG. 1 illustrates an example environment 100 that includes a set of user devices 110 (referred to collectively as "endpoints 110" and individually as "endpoint 110"), a set of server devices 120 (referred to collectively as "server devices 120" and individually as "server device 120"), a compliance manager 130, and a network 140. Devices of environment 100 may interconnect via wired connections, wireless connections, or a combination of wired and wireless connections.

Endpoint 110 includes one or more devices capable of receiving, generating, storing, processing, and/or providing information associated with an account and/or a transaction for which the account is to be used. For example, endpoint 110 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 120 includes one or more devices capable of receiving, providing, storing, processing, and/or generating information associated with an account and/or a transaction for which the account is to be used. For example, server device 120 may include a server (e.g., in a data center or a cloud computing environment), a data center (e.g., a multi-server micro data center), a workstation computer, a virtual machine (VM) provided in a cloud computing environment, or a similar type of device. In some implementations, server device 120 may include a communication interface that allows server device 120 to receive information from and/or transmit information to other devices in environment 100.

Compliance manager 130 includes a computing system of one or more devices capable of processing information from and/or transmitting information to endpoints 110, as described in greater detail below. In an example implementation, as shown in FIG. 1, server device 120 includes the compliance manager 130. In some examples, server device 120 may comprise a cloud server or a group of cloud servers. In some implementations, the compliance manager 130 may be designed to be modular, such that certain software components can be swapped in or out depending on a particular need. As such, the compliance manager 130 may be easily and/or quickly reconfigured for different uses.

In various implementations, the compliance manager 130 communicates with a software agent 145 residing on the endpoints 110. The software agent 145 comprises a computing system capable of executing commands on a particular endpoint 110. For example, the software agent 145 may comprise executable software that monitor and implement a system configuration on the particular endpoint 110. The system configuration may comprise one or more system settings and/or system setting values within the particular endpoint 110. In various implementations, the software agent 145 is capable of retrieving and/or system settings and/or system setting values through various techniques. For example, the software agent 145 may use a suitable application programming interface (API) to retrieve and/or set system settings and/or system setting values within the particular endpoint 110. For instance, the software agent 145 may retrieve and/or set system settings and/or system setting values that are stored within a database, such as the Microsoft® Registry, or the like. The system settings and/or system setting values can comprise registry data, security policy data, audit policy data, service data, firewall policy data, control panel setting data, or the like.

It is understood that, in some implementations, the compliance manager 130 and the software agent 145 may reside on an endpoint 110. For example, the compliance manager 130 and the software agent 145 may comprise one or more software packages residing on the endpoint 110 such that software package(s) perform the functionality described below on the endpoint 110.

As used herein:
a system setting may be defined as a modifiable data item stored on an endpoint 110, the value of which is used by the operating system or some program(s) on endpoint 110 to determine a specific aspect of their behavior as well as describe a collection of metadata necessary for an implementation of the disclosure to access and modify a given system setting as well as determine the viability and preferability of the possible values it can be set to;
a supported system setting is a system setting that a given implementation of the present disclosure is able to manage;
a system configuration is a mapping of one or more system settings to a value for which the respective system setting can be set to;
a base system configuration may be defined as a system configuration that includes each system setting applicable to an endpoint's 110 endpoint profile, set to the value that is considered to provide the best security;
an endpoint profile may be used to determine applicable system settings and the specific implementation procedures for the system settings;
an optimal system configuration may be defined a system configuration that is as close as possible to the base system configuration without disrupting the endpoint's 110 typical operations; and
an actual system configuration may be defined as the system configuration that is implemented on the particular endpoint 110.

Network 140 includes one or more wired and/or wireless networks. For example, network 140 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
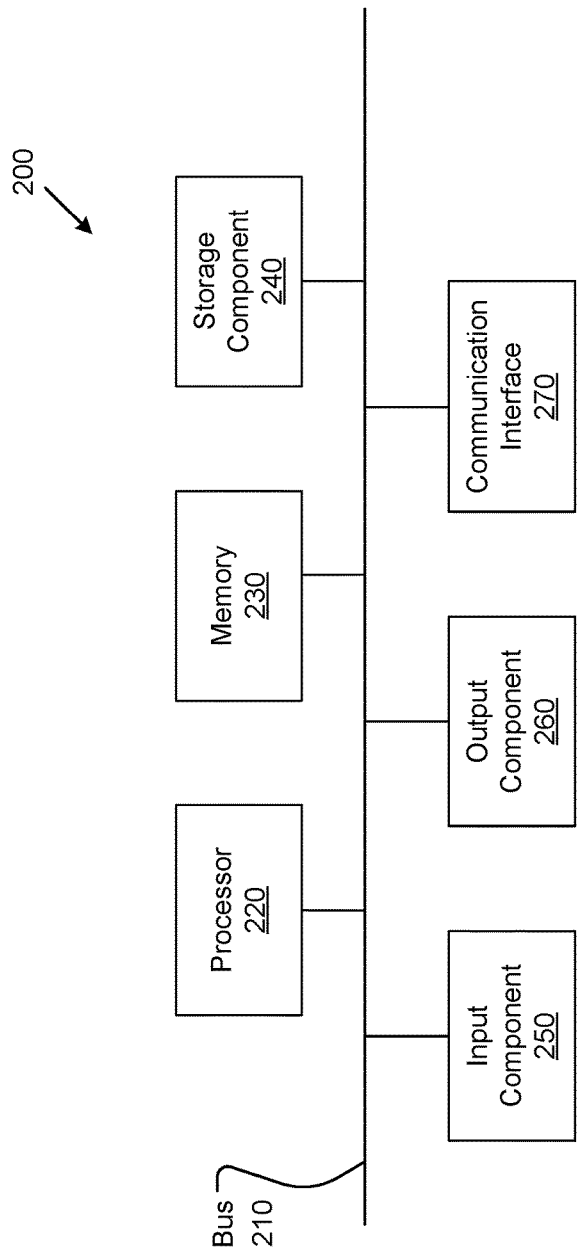
FIG. 2 is a diagram of an example computing device.
Figure 3:
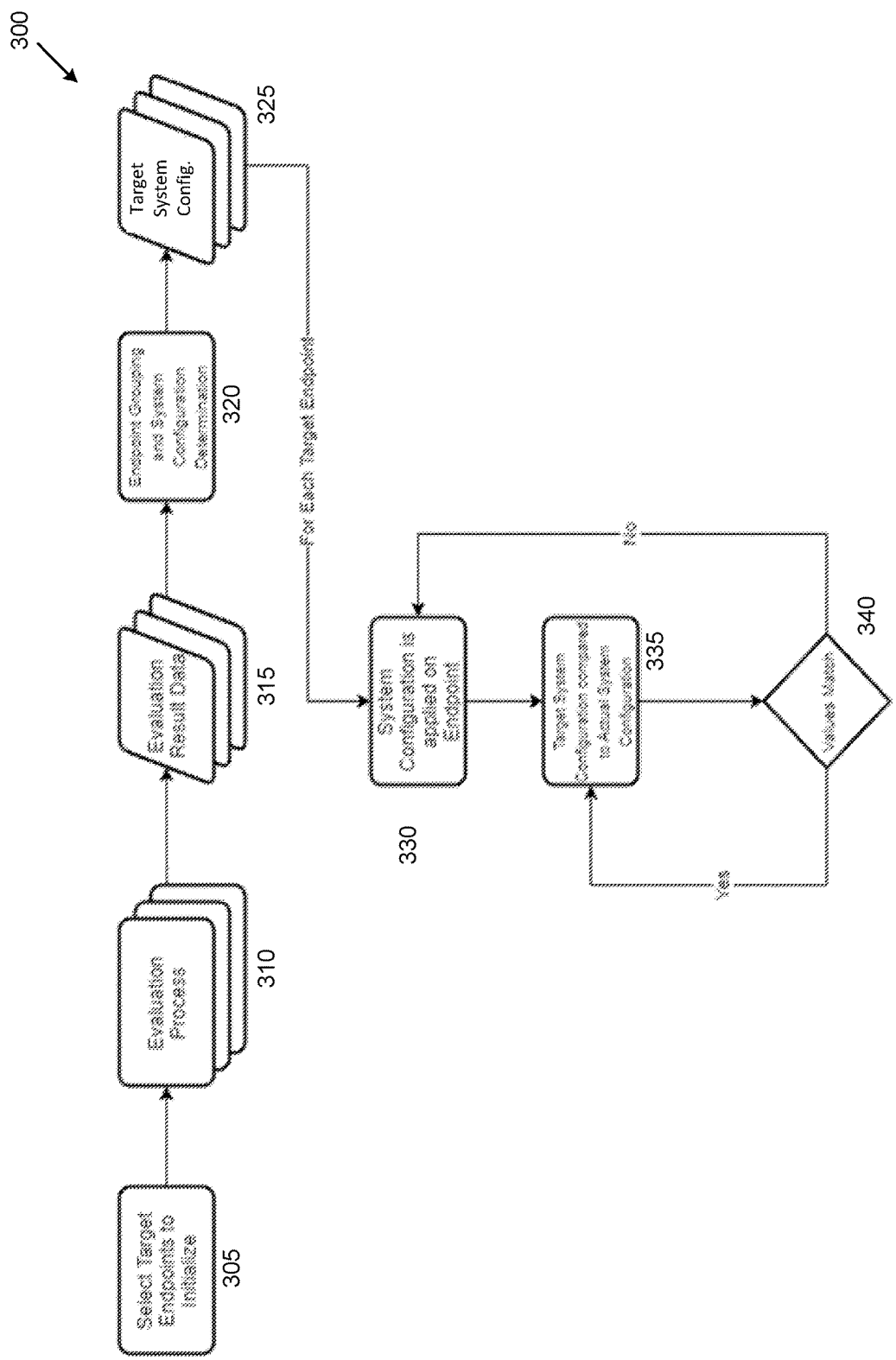
FIG. 3 is a flow diagram illustrating a process for determining and enforcing an optimal system configuration.

FIG. 2 is a diagram of example components of a device 200. Device 200 may correspond to endpoint 110, server device 120, In some implementations, endpoint 110 and/or server device 120, may include one or more devices 200 and/or one or more components of device 200. As shown in FIG. 3, device 200 may include a bus 210, a processor 220, a memory 230, a storage component 240, an input component 250, an output component 260, and a communication interface 270.

Bus 210 includes a component that permits communication among the components of device 200. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random-access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes based on processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIG. 3 is a flow chart of an example process 300 for determining and enforcing an optimal system configuration for one or more endpoints 110. In some implementations, one or more process blocks of FIG. 3 may be performed by compliance manager 130 and/or the software agent 145. In some implementations, one or more process blocks of FIG. 3 may be performed by another device or a group of devices separate from or including compliance manager 130, such as endpoint 110 and/or server device 120. In an example implementation, in the process 300 described below, blocks 305 and 320 may be performed by the compliance manager 130 and the software agents 145 for respective endpoints 110 would perform the other blocks of process 300. With respect to blocks 310, 315, and 325, multiple instances of the action may be performed and/or multiple instances of the data generated, i.e., for each endpoint 110. The compliance manager 130 can analyze data and determine actions to be performed based on data received from each endpoint 110. The software agent 145 can collect data from the corresponding endpoint 110 and enforce decisions provided by the compliance manager 130.

As shown in FIG. 3, target endpoints 110 are selected at block 305. One or more endpoints 110 can be selected for initialization based on the endpoints 110 inclusion in a particular domain, e.g., the endpoint 110 is connected to a particular domain controller. The selected endpoints 110 are evaluated, which is described in greater detail below with respect to FIG. 4, at block 310. For example, the evaluation process generates evaluation result data 315. At block 320, which is described in greater detail below with respect to FIG. 5, selected endpoints 110 with similar evaluation result data 315 are put into groups and target system configurations are determined for each group according to the evaluation result data 315 to generate system configurations 325 for each group of endpoints 110. Endpoints 110 that do not have similar evaluations can be placed into their own group for system configuration 325 purposes. The target system configurations 325 for a particular endpoint 110 are transmitted to the software agents 145.

At block 330, the system configurations 325 are applied to the endpoint 110. The target system configuration 325 that the software agent 145 is attempting to match for an endpoint 110 is compared to the actual system configurations at block 335. At determination block 340, if the endpoint's 110 target system configuration matches the actual system configuration, the process 300 returns to block 335. In some implementations, depending on the APIs available on the endpoint 110, the software agent 145 listens for events indicating a change in the system settings and performs the comparison of target and actual whenever such event is detected. For another example, the software agent 145 may choose to perform the comparison at a set frequency, such as once every twenty minutes. Otherwise, the process 300 returns to block 330 to correct the discrepancies.

Figure 4:
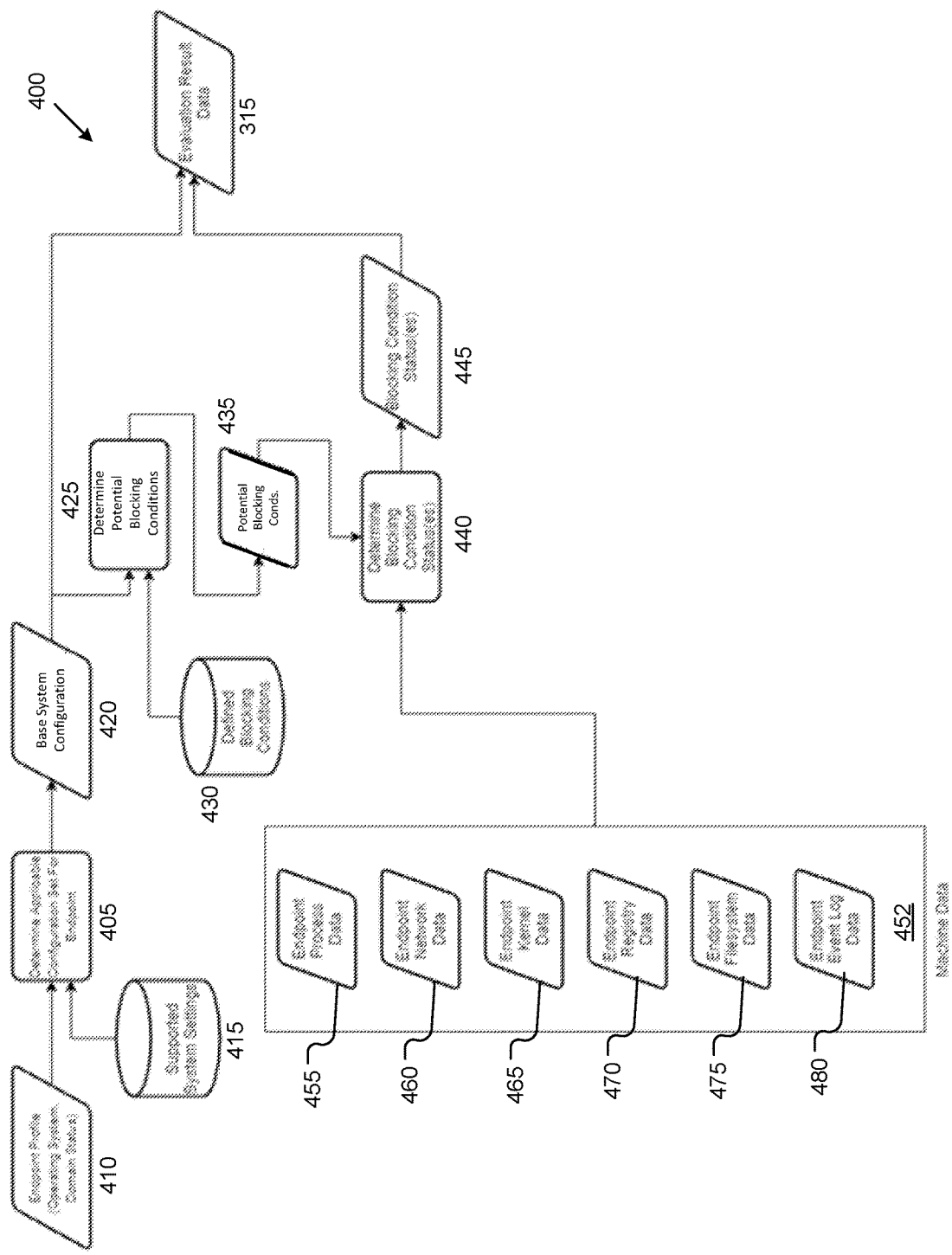
FIG. 4 is a flow diagram illustrating a process for evaluating an endpoint.

FIG. 4 is a flow chart of an example process 400 for evaluating a single endpoint 110. The process 400 can gather the necessary data to determine the optimal system configuration for the endpoint and conglomerates it into evaluation result data 315 In some implementations, one or more process blocks of FIG. 4 may be performed by compliance manager 130 and/or the software agent 145. In some implementations, one or more process blocks of FIG. 4 may be performed by another device or a group of devices separate from or including compliance manager 130, such as endpoint 110 and/or server device 120. In an example implementation, an individual software agent 145 residing on the target endpoint 110 can perform the steps described herein.

As shown in FIG. 4, at block 405, the software agent 145 determines a base system configuration 420 for the target endpoint 110 based on the endpoint profile 410 and supported system settings 415. An endpoint profile 410 for a particular endpoint 110 can be generated by the software agent 145. In an example implementation, the software agent 145 generates the endpoint profile 410 at the beginning of the process 400 based on one or more system settings. In another example implementation, the software agent 145 obtains a preset endpoint profile 410. For example, the software agent 145 can determine base system configurations 420 by filtering the list of its supported system settings for only those marked as applicable to the endpoint profile, then build the base system configuration 420 by assigning the preferred value described in the setting's metadata. The software agent 145 may retrieve the supported system settings corresponding to the endpoint profile that is stored in a repository of the server device 120, such as a database or the like. In other examples, the software agent may retrieve the supported system settings stored in a repository of the target endpoint 110. In one or more implementations, the supported system settings can comprise a software object.

At block 425, potential blocking conditions 435 for the target endpoint 110 are determined. The potential blocking conditions 435 can be determined by retrieving the defined blocking conditions 430 and filtering them down to only those that affect at least one system setting contained in the base system configuration 420. A blocking condition 430 is a specific condition that, when met, would make one or more possible values of a system setting become less desirable. In most cases, if a blocking condition is met for an endpoint 110, the system setting values that are affected by that blocking condition would cause a disruption to the endpoint's 110 typical operations. For example, if the base system configuration for the endpoint 110 mandates the enabling of a system setting that blocks all traffic on the Secure Shell (SSH) communication port 22, a blocking condition that would make applying that value to that system setting less desirable is if the endpoint 110 actually has intended traffic on port 22. An implementation of the disclosure includes a collection of defined blocking conditions 430 that includes metadata on each blocking condition necessary for determining what system setting values are affected by them and for determining if a system meets a blocking condition or not. This collection might be included as part of the software agent 145, or it might be stored elsewhere and made accessible to the software agent via an API. In some implementations, the defined blocking conditions 430 and the supported system settings 415 can both be stored together.

At block 440, the software agent 145 determines the status of each potential blocking condition. A blocking condition status indicates whether or not the condition has been met. Each blocking condition would have a unique process to determine its status, which could involve the usage of different types of machine data 452 available on the endpoint 110. Examples of machine data 452 that might be used in determining a blocking condition status include, but is not limited to, endpoint process data 455, endpoint network data 460, endpoint kernel data 465, endpoint registry data 470, endpoint filesystem data 475, and/or endpoint event log data 480. An example process that might be performed in the determination of a blocking condition status is an API call to retrieve the exact version of the endpoint's 110 operating system and check whether or not it is greater than or equal to the version that one or more supported system settings were first made available. Another example would be monitoring network traffic on the endpoint 110 over a given timeframe to determine if SSH connections are part of the endpoint's 110 typical operations. Once all blocking condition statuses 445 are determined, the evaluation result data 315 is generated by aggregating the blocking condition statuses 445 and the base system configuration 420. Additionally, the evaluation result data 315 may include all of the metadata of the checked blocking conditions, including the system setting values they affect, if the implementation of the compliance manager does not have access to that data on its own. The evaluation result data 315 is then transmitted to the compliance manager 130 for use in determining the target system configuration for the endpoint 110.

Figure 5:
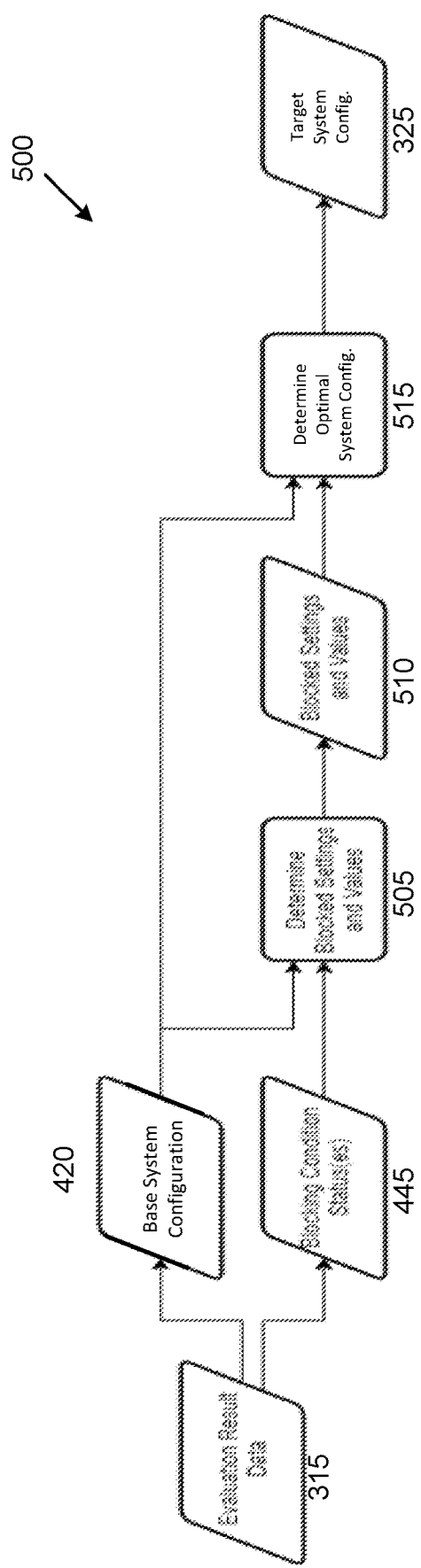
FIG. 5 is a flow diagram illustrating a process for determining optimal system configuration for an endpoint based on evaluation result data or a group of endpoints with similar evaluation result data.

FIG. 5 is a flow chart of an example process 500 for determining optimal system configuration for an endpoint 110 based on evaluation result data 315 or a group of endpoints 110 with similar evaluation result data 315. In some implementations, one or more process blocks of FIG. 5 may be performed by compliance manager 130 and/or the software agent 145. In some implementations, one or more process blocks of FIG. 5 may be performed by another device or a group of devices separate from or including compliance manager 130, such as endpoint 110 and/or server device 120. In an example implementation, the blocks of process 500 can be performed by the compliance manager 130.

At block 505, blocked settings and/or values 510 are determined based on the base system configurations 420 and the blocking condition status(es) 445. At block 515, an optimal system configuration for a target endpoint 110 is determined. The determined optimal system configuration becomes the target system configuration 325 for the endpoint(s) 110. The compliance manager 130 determines the optimal system configuration by copying and/or setting the [recommended] system configuration except when the value called for is one of the blocked ones, i.e., blocked setting and/or values 510, in which case the system setting is set to the next most secure unblocked value, if any.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising a computer including a processor and a memory, the memory including instructions such that the processor is programmed to:
   evaluate a plurality of endpoints to create evaluation result data for each endpoint, the evaluation result data including a base system configuration and a blocking condition status, wherein the blocking condition status comprises a set of qualities of at least one endpoint and its typical operation indicating at least one value of at least one system setting within the base system configuration would disrupt typical operation of the at least one endpoint;

determine an optimal system configuration for each endpoint of the plurality of endpoints by identifying at least one blocked setting within the base system configuration based on the blocking condition status and modifying the base system configuration by replacing the blocked setting with a next secure unblocked value for that setting;

set a target system configuration to the optimal system configuration; and transmit the target system configuration to a software agent corresponding to each endpoint of the plurality of endpoints to cause system settings in each endpoint of the plurality of endpoints to be set according to the target system configuration.

2. The system as recited in claim 1, wherein the processor is further programmed to receive the blocking condition status from at least one software agent.

3. The system as recited in claim 2, wherein the at least one software agent performs an application programming interface (API) call to determine the blocking condition status.

4. The system as recited in claim 2, wherein the at least one software agent is configured to determine the base system configuration based on supported system settings unique to an endpoint of the plurality of endpoints.

5. A system comprising:
a server device; and
a plurality of endpoints communicatively connected to the server device,
wherein the server device comprises a computer including a processor and a memory, the memory including instructions such that the processor is programmed to:
evaluate a plurality of endpoints to create evaluation result data for each endpoint, the evaluation result data including a base system configuration and a blocking condition status, wherein the blocking condition status comprises a set of qualities of at least one endpoint and its typical operation that indicate indicating at least one value of at least one system setting within the base system configuration would disrupt typical operation of the at least one endpoint;
determine an optimal system configuration for each endpoint of the plurality of endpoints by identifying at least one blocked setting within the base system configuration based on the blocking condition status and modifying the base system configuration by replacing the blocked setting with a next secure unblocked value for that setting;
set a target system configuration to the optimal system configuration; and
transmit the target system configuration to a software agent corresponding to each endpoint of the plurality of endpoints to cause system settings in each endpoint of the plurality of endpoints to be set according to the target system configuration.

6. The system as recited in claim 5, wherein the processor is further programmed to receive the blocking condition status from at least one software agent.

7. The system as recited in claim 5, wherein the server comprises a domain controller.

8. The system as recited in claim 6, wherein the at least one software agent is configured to determine the base system configuration based on supported system settings unique to an endpoint of the plurality of endpoints.

9. A method comprising:
evaluating, via a processor, a plurality of endpoints to create evaluation result data for each endpoint, the evaluation result data including a base system configuration and a blocking condition status, wherein the blocking condition status comprises a set of qualities of at least one endpoint and its typical operation that indicate indicating at least one value of at least one system setting within the base system configuration would disrupt typical operation of the at least one endpoint;
determining an optimal system configuration for each endpoint of the plurality of endpoints by identifying at least one blocked setting within the base system configuration based on the blocking condition status and modifying the base system configuration by replacing the blocked setting with a next secure unblocked value for that setting;
setting a target system configuration to the optimal system configuration; and
transmitting the target system configuration to a software agent corresponding to each endpoint of the plurality of endpoints to cause system settings in each endpoint of the plurality of endpoints to be set according to the target system configuration.

10. The method as recited in claim 9, further comprising receiving the blocking condition status from at least one software agent.

11. The method as recited in claim 10, wherein the at least one software agent performs an application programming interface (API) call to determine the blocking condition status.

12. The method as recited in claim 10, wherein the at least one software agent is configured to determine the base system configuration based on supported system settings unique to an endpoint of the plurality of endpoints.

* * * * *